US009204735B2

(12) United States Patent
McMahon et al.

(10) Patent No.: US 9,204,735 B2
(45) Date of Patent: Dec. 8, 2015

(54) SYSTEM FOR CHARGING DISPLAYS

(75) Inventors: Michael T. McMahon, Salem, OH (US); Dennis D. Belden, Jr., Canton, OH (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 945 days.

(21) Appl. No.: 13/414,848

(22) Filed: Mar. 8, 2012

(65) Prior Publication Data
US 2013/0200879 A1    Aug. 8, 2013

Related U.S. Application Data

(60) Provisional application No. 61/594,469, filed on Feb. 3, 2012.

(51) Int. Cl.
*H02J 7/00*    (2006.01)
*A47F 3/00*    (2006.01)

(52) U.S. Cl.
CPC ............... *A47F 3/00* (2013.01); *H02J 7/0052* (2013.01); *H02J 2007/0096* (2013.01)

(58) Field of Classification Search
CPC ... Y02T 10/7088; H02J 7/0004; H02J 7/0052
USPC ........... 320/107, 112–114; 323/318, 322, 353
See application file for complete search history.

(56) References Cited

U.S. PATENT DOCUMENTS

| 5,570,002 | A | 10/1996 | Castleman |
| 5,949,213 | A | 9/1999 | Lanni |
| 6,054,846 | A | 4/2000 | Castleman |
| 6,266,261 | B1 | 7/2001 | Lanni |
| 6,809,943 | B2 | 10/2004 | Lanni |
| 6,903,950 | B2 | 6/2005 | Afzal et al. |
| 6,922,347 | B2 | 7/2005 | Lanni |
| 6,949,916 | B2 | 9/2005 | Chapuis |
| 6,972,975 | B2 | 12/2005 | Su |
| 7,002,265 | B2 | 2/2006 | Potega |
| RE39,036 | E | 3/2006 | Castleman |
| 7,554,828 | B2 | 6/2009 | Wilson |
| D597,961 | S | 8/2009 | Stirling |
| D598,393 | S | 8/2009 | Stirling |
| D598,394 | S | 8/2009 | Stirling |
| D601,508 | S | 10/2009 | Stirling |

(Continued)

FOREIGN PATENT DOCUMENTS

DE      202004012487      2/2005

*Primary Examiner* — Paul Dinh
(74) *Attorney, Agent, or Firm* — Nelson Mullins Riley & Scarborough LLP

(57) ABSTRACT

A system and method for charging a merchandise item is presented. A power supply system for charging the merchandise item includes: a power supply unit, a power cable with a cable control logic. The power supply unit includes a variable power supply and power supply control logic. The power supply can be attached at one end to a power socket of the merchandise item and at the other end to the power supply unit. The cable control logic reads a power requirement from a charge adaptor logic located near the end of the cable connected to the merchandise item and communicates it over the power cable to the power supply control logic. The power supply control logic controls the variable power supply based, at least in part, on the power requirement so that the variable power supply generates a supplied voltage onto the power cable to power the merchandise item.

13 Claims, 3 Drawing Sheets

(56) References Cited

U.S. PATENT DOCUMENTS

| | | |
|---|---|---|
| 7,646,620 B2 | 1/2010 | MacDonald et al. |
| 7,701,739 B2 | 4/2010 | Mollo |
| D616,821 S | 6/2010 | The |
| D617,272 S | 6/2010 | The |
| 7,727,031 B2 | 6/2010 | Lord |
| 7,770,039 B2 | 8/2010 | DuBose |
| 7,779,278 B2 | 8/2010 | DuBose |
| 7,781,908 B2 | 8/2010 | DuBose |
| 7,795,759 B2 | 9/2010 | DuBose et al. |
| 7,795,760 B2 | 9/2010 | DuBose |
| 7,884,570 B2 | 2/2011 | Purdy et al. |
| 7,902,803 B2 | 3/2011 | Peng et al. |
| 7,904,738 B2 | 3/2011 | DuBose |
| 7,908,498 B2 | 3/2011 | DuBose |
| 2003/0218550 A1 | 11/2003 | Herrmann |
| 2006/0098369 A1 | 5/2006 | Wambsganss et al. |
| 2009/0134709 A1 | 5/2009 | Sun |
| 2009/0268491 A1 | 10/2009 | Wilson |
| 2011/0037445 A1 | 2/2011 | Ting et al. |
| 2013/0200841 A1* | 8/2013 | Farkas et al. .................. 320/107 |
| 2014/0292256 A1* | 10/2014 | Yamato et al. ................ 320/107 |

* cited by examiner

SYSTEM FOR CHARGING DISPLAYS

CROSS REFERENCE TO RELATED APPLICATION

This application claims priority from U.S. Provisional Application Ser. No. 61/594,469, filed Feb. 3, 2012, the disclosure of which is incorporated herein by reference.

BACKGROUND OF THE INVENTION

1. Field of Invention

The current invention relates generally to apparatus, systems and methods for charging and/or supplying power to electronic items. More particularly, the apparatus, systems and methods relate to charging and/or supplying power to electronic items on display in a commercial setting. Specifically, the apparatus, systems and methods provide for charging and/or supplying power to electronic items with the use of dual microcontrollers with one of the controllers reading a charge adapter to determine the required voltage.

2. Description of Related Art

Merchants often desire displaying powered-up electronic devices to consumers so that the consumers can handle and explore the various functions of different electronic devices. For example, a merchant may wish to display a variety of different cellular phones so that consumers can handle and evaluate the functionality of each phone. Alternatively, merchants may desire displaying cameras, computer-related devices, electronic games and the like powered-up to allow the handling and exploration of these devices.

A display that exhibits electronic items will often show several different electronic items. Traditional power supplies for these types of displays would provide a central power supply that would supply power to each electronic device through a corresponding power cable attached between each electronic device and the central power supply. The central power supply in general supplied one main voltage level to each power cable so that each electronic device needed to be able to accept the same voltage level. Alternatively, voltage converters could be used to convert the main voltage to different voltage levels; however, converters add substantial cost to the charging system and take up additional space. Also, today's electronic devices often require large currents, increasing the voltage loss in the power cable and connectors, resulting in a significant difference between the voltage supplied by the power supply and what is expected by the electronic device. What is needed is a better way to supply power to electronic items on display in a commercial setting.

SUMMARY OF THE INVENTION

The preferred embodiment of the invention includes a power supply system for charging and/or supplying power to a merchandise item. The power supply system includes a power supply unit and a power cable with a cable control logic. The power supply unit includes a variable power supply and power supply control logic. In the preferred embodiment, the power supply control logic and the cable control logic are microcontrollers executing software instructions. The power supply can be attached at one end to a power socket of the merchandise item and to the power supply unit at the other end. The cable control logic reads a power requirement from a charge adaptor logic connected there the end of the power cable connected to the merchandise item and communicates it over the power cable to the power supply control logic. The power supply control logic controls the variable power supply based, at least in part, on the power requirement so that the variable power supply generates the proper voltage into the power cable to charge/power the merchandise item.

In some configurations of the preferred embodiment, the power cable includes two conductors (e.g., wires) for transmitting the supplied voltage and a single communications conductor over which the cable control logic and the power supply control logic communicate. These three wires can be the only three wires of the power cable. The power supply control logic and the cable control logic can communicate over the single communication wire using digital messages.

In another configuration of the preferred embodiment, the power supply system has resistors for measuring the supplied voltage at the second end of the power cable. An analog-to-digital converter (ADC) that is either discrete or internal to a microcontroller generates digital voltage values corresponding with those measurements. The cable control logic then sends at least some of the digital voltage values over the power cable to the power supply control logic. The power supply control logic is configured to receive the digital voltage values and to control the variable power supply based, at least in part, on the digital voltage values.

In another configuration, a measuring device periodically measures the supplied voltage at the second end of the cable and creates corresponding measured voltage values. For example, the measuring device can be one or more load voltage sensing resistors. The cable control logic sends at least some of these measured voltage values over the power cable to the power supply control logic. The power supply control logic controls the variable power supply based, at least in part, on the digital voltage values. The power supply can control the variable power supply based, at least in part, on the measured voltage values and on known line and connector losses of the power cable.

The preferred embodiment of the invention can include other useful features and characteristics. For example, the power supply can include a regulator for regulating the voltage of the communication circuit (conductor). The charge adaptor logic can be a memory device, or can be one or more resistors that set the desired output voltage of the power supply. The charge adaptor can be located near the end of the power cable connected to merchandise item.

A second embodiment is a power line for charging and/or supplying power to an electronic item. The power line includes a power cable and a microcontroller. The power cable has a first end and a second end and three or more conductors. The first end can be connected to a variable power supply and the second end can be connected to the electronic item so that it can power and/or charge the electronic item. The microcontroller reads voltage requirements from the charge adapter associated with the electronic item and communicates the voltage requirement over the power cable to a power supply unit.

In another configuration, the power line includes load voltage-sensing resistors. These resistors are used to measure the voltage at the second end of the power cable and to produce the voltage measurements. The microcontroller receives the voltage measurements and digitally communicates at least some of the voltage measurements to the variable power supply.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
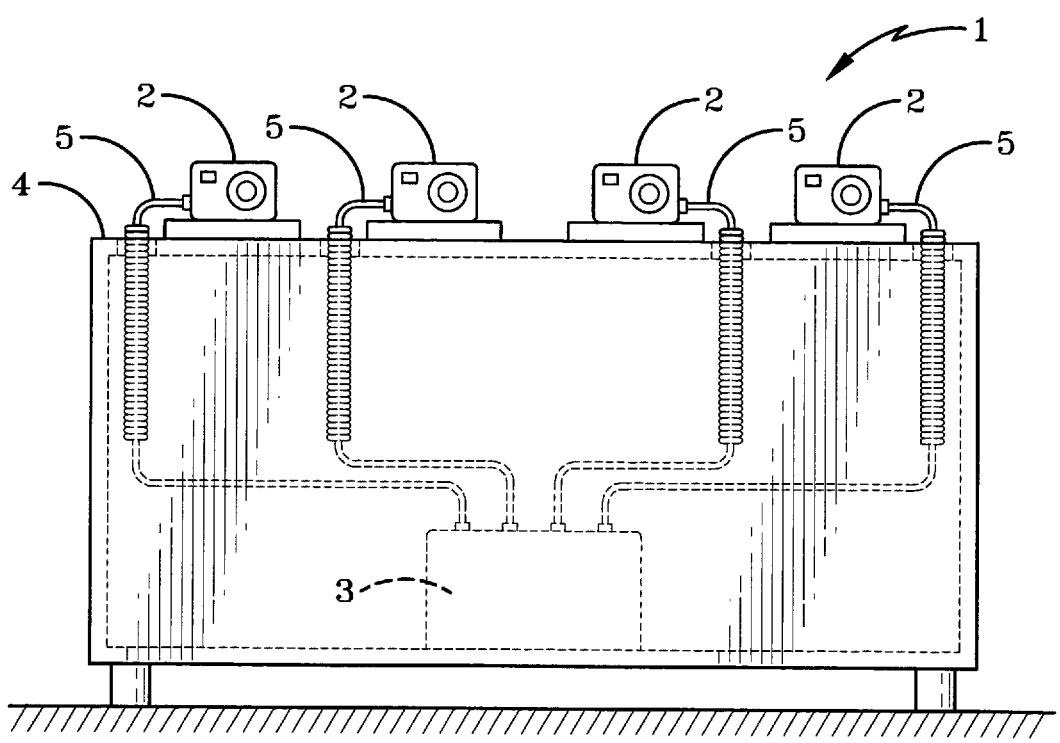
FIG. 1 illustrates a preferred embodiment of a power supply system.

FIG. 1 illustrates the preferred embodiment of a power supply system 1. The system 1 provides power to merchandise items 2 displayed at a display cabinet 4 or another type of suitable display at a retail establishment. In FIG. 1, the merchandise items 2 are shown as cameras, however, other merchandise items 2 can be powered by the power supply system 1. For example, the system 1 can power electronic devices such as cellular phones, computers, electronic games and the like. A power supply unit 3 provides power to one or more of the merchandise items 2 through one or more cables 5.

Figure 2:
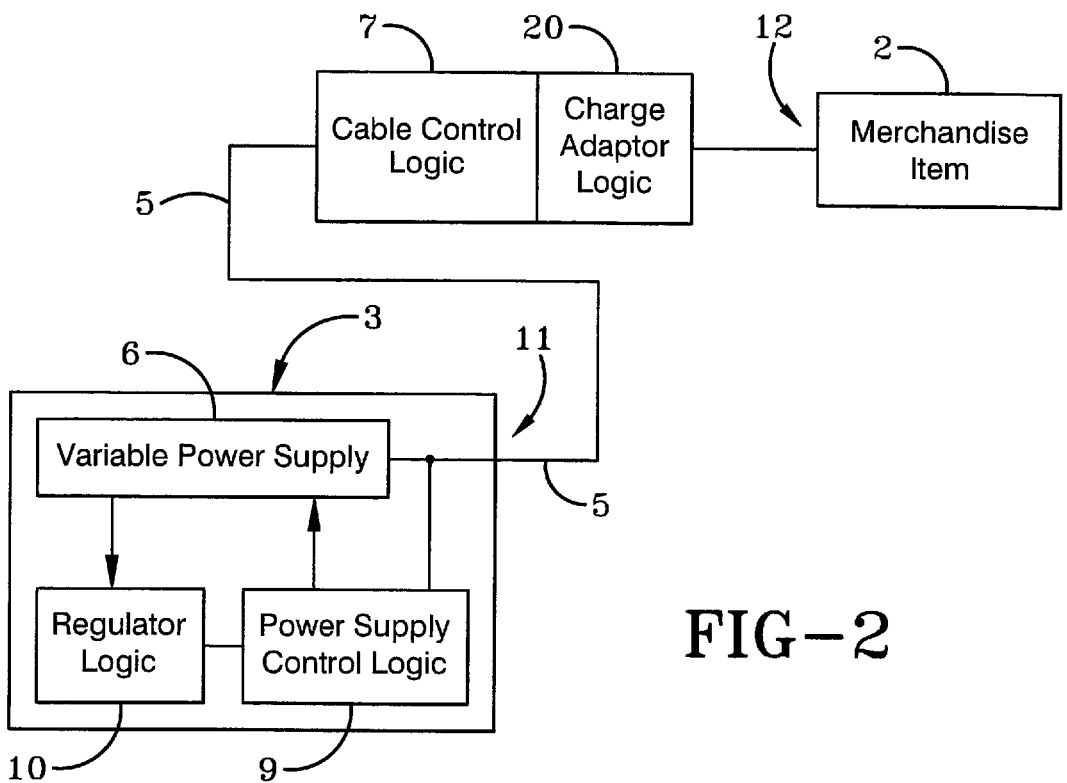
FIG. 2 illustrates in more detail the preferred embodiment of a power supply system.

FIG. 2 illustrates some of the novel features of the preferred embodiment. The power supply unit 3 includes a variable power supply 6, a charge adapter logic 20 and a power supply control logic 9. In the preferred embodiment, the variable power supply 6 can be a power supply that is variable between +3 volts and +13 volts, for example. The power supply unit 3 is connected to the first end 11 of a cable 5 that has its second end 12 connected to a merchandise item 2. Also, in the preferred embodiment, a cable control logic 7 is located near the second end 12 of the cable 5 with a charge adapter logic 20 also located near the second end of the cable 5. In FIG. 2, the charge adapter logic 20 is illustrated adjacent the cable control logic 7, however, there may be a portion of cable 5 located between them with the charge adapter logic 20 located close to the second end 12 of the cable 5. As discussed later, the cable 5 is a three-wire cable in the preferred embodiment.

Having discussed the primary components of the power supply system 1, operation of the power supply system is now discussed before introducing a more detailed schematic diagram. A relatively simple and interchangeable charge adapter logic 20 is used to specify a voltage and/or current requirement that is suitable for the types of merchandise items 2 that may be powered by the second end 12 of the cable. For example, the charge adapter logic 20 can be one or more resistors, a memory such as an electronically erasable programmable read-only memory (EEPROM) or another memory or another type of logic device from which power requirements can be read.

"Logic", as used herein, includes but is not limited to hardware, firmware, software and/or combinations of each to perform a function(s) or an action(s), and/or to cause a function or action from another logic, method, and/or system. For example, based on a desired application or need, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

Initially, the cable control logic 7 will read the value of the charge adapter logic 20 to determine what type of voltage and/or current is needed at the second end 12 of the cable 5. In the preferred embodiment, the cable control logic 7 communicates this information as digital data over a single wire of the three-wire cable 5 to the power supply control logic 9. The power supply control logic 9 in turn makes the appropriate power request to the variable power supply 6. In the preferred embodiment, the cable control logic 7 and the power supply control logic 9 are microcontrollers executing software instructions, however, any suitable form of logic may be used. Use of a separate charge adapter logic 20 to specify a power requirement allows the same program to be run in the cable control logic (e.g., microcontroller) without needing to change or alter programs to set different power requirement.

Once the variable power supply 6 has received the desired voltage and/or current (e.g., power) requirements from the power supply control logic 9, the variable power supply 6 will begin to supply those power requirements to the cable 5. After initializing the initial power requirements, the cable control logic 7 then begins to monitor the actual voltage and/or power that is received at its end of the cable 5 and will send this information back to the power supply control logic at the first end 11 of the cable. In the preferred embodiment, this information is sent over a single communications wire of a three-wire cable 5 to the power supply unit 3. The power supply control logic 9 can continually monitor the power output at the second end 12 of the cable 5, as well as a voltage and/or current measured at the second end of the cable 12 and sent to it by the cable control logic 7. The power supply control logic 9 can use this information to control the variable power supply 6 so that it produces the correct voltage as desired by the merchandise item 2. The regulator logic 10 supplies power for the single wire communication as well as for the microcontroller at the second end of the cable. In some configurations, the power supply control logic 9 can include the cable control logic 7.

The regulator 10 supplies power for the single wire communication as well as for the microcontroller logic at the second end of the cable. The power supply logic includes also the communication logic.

In another configuration, the power supply control logic 9 and/or the cable control logic can calculate signal parameters and evaluate the state of the conductors within the power cable 5. For example, over voltage conditions, over current conditions and open wire conditions can all be evaluated and detected. Light emitting diodes (LEDs) can be used to blink these conditions. For example, three blinks can indicate three volts is present on a conductor and five blinks can indicate 5 volts is present while other LEDs can be flashed to indicate open conditions, etc.

Figure 3:
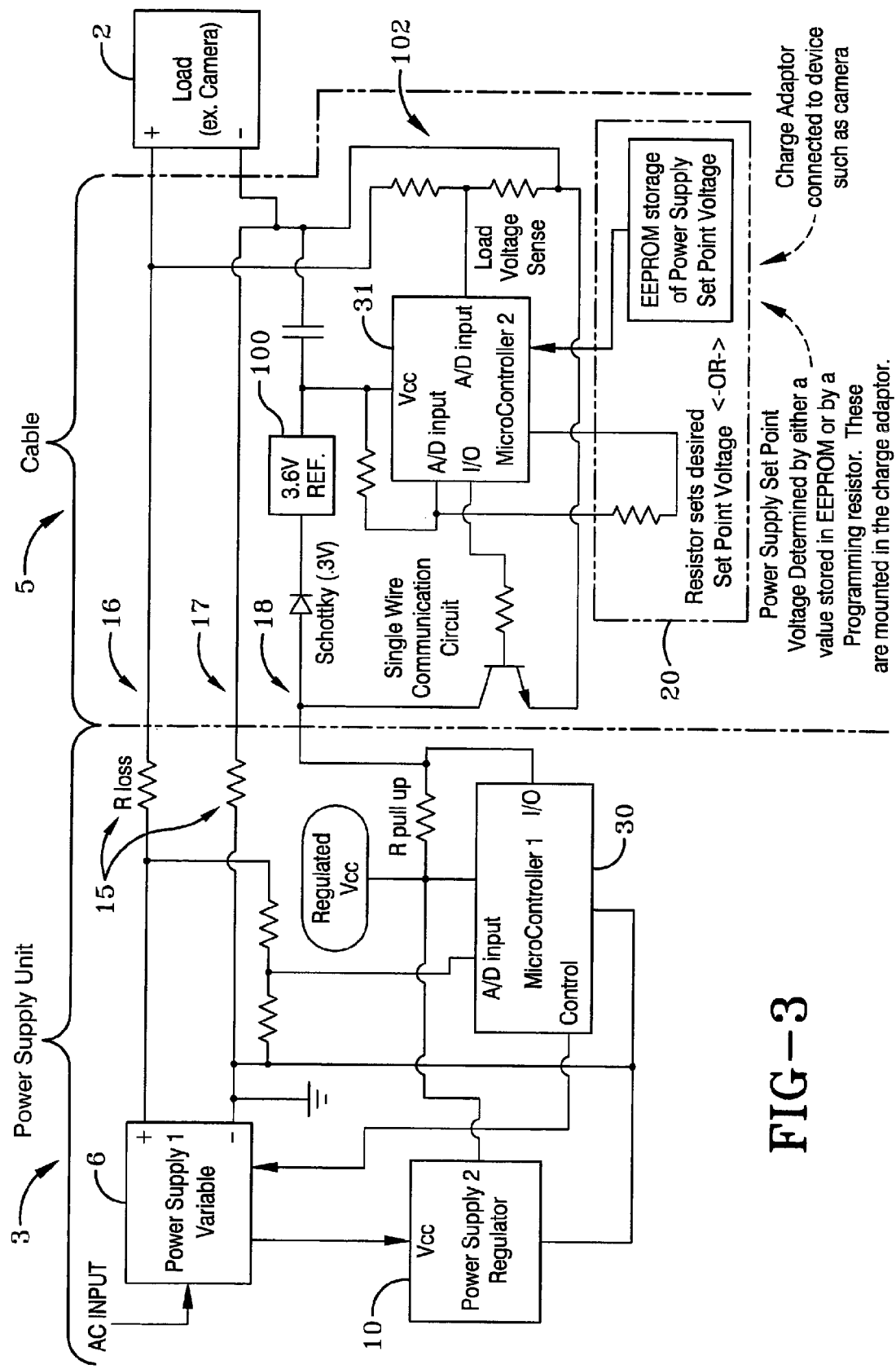
FIG. 3 illustrates an electrical schematic of the preferred embodiment of the power supply system.

FIG. 3 illustrates an example schematic diagram of the power supply system 1. This figure illustrates many of the components already discussed in addition to the preferred embodiment of a three-wire cable. The conductor (wire) labeled 16 is the positive (V+) voltage supplied to the merchandise item 2 and the conductor labeled 17 is the negative (V−) voltage supplied to the merchandise item 2. Single wire communications conductor 18 is the single wire over which microcontroller 30 and microcontroller 31 communicates digitally as discussed above. Microcontroller 30 and microcontroller 31 are respectively similar to the power supply control logic 9 and the cable control logic 7 discussed above. Line loss resistors 15 are included in the schematic to represent line loss but are not added as part of the actual implementation of the power supply system 1. However, microcontroller 30 can account for this loss and other losses such as connector losses when requesting a desired voltage from the variable power supply 6 so that the proper voltage is received by the merchandise item 2.

In more detail, in on configuration of the preferred embodiment the power supply 6 supplies the external circuits (i.e., charge adapter, microcontroller 2, communications circuits, etc) with a nominal +4.7 voltage, through a pull up resistor R and the Schottky diode. Since this voltage is used for the reference voltage of the A/D converter, it must be accurate. Inaccuracies occur since this A/D reference voltage ends up being "noisy" as a function of the line losses that occur on the negative side of the power. To make the A/D reference immune from these losses and to achieve a higher degree of accuracy, an additional precision voltage regulator 100 or precision voltage reference is used. In this configuration, a 3.6 volt precision voltage reference 100 is used. Using this precision voltage regulator 100 allows for the elimination or at least the minimization of line losses and an accurate voltage measurement can be obtained by load voltage sense resistors 102.

Having described the components of the power supply system 1, its operation will now be described with reference to example methods. The example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
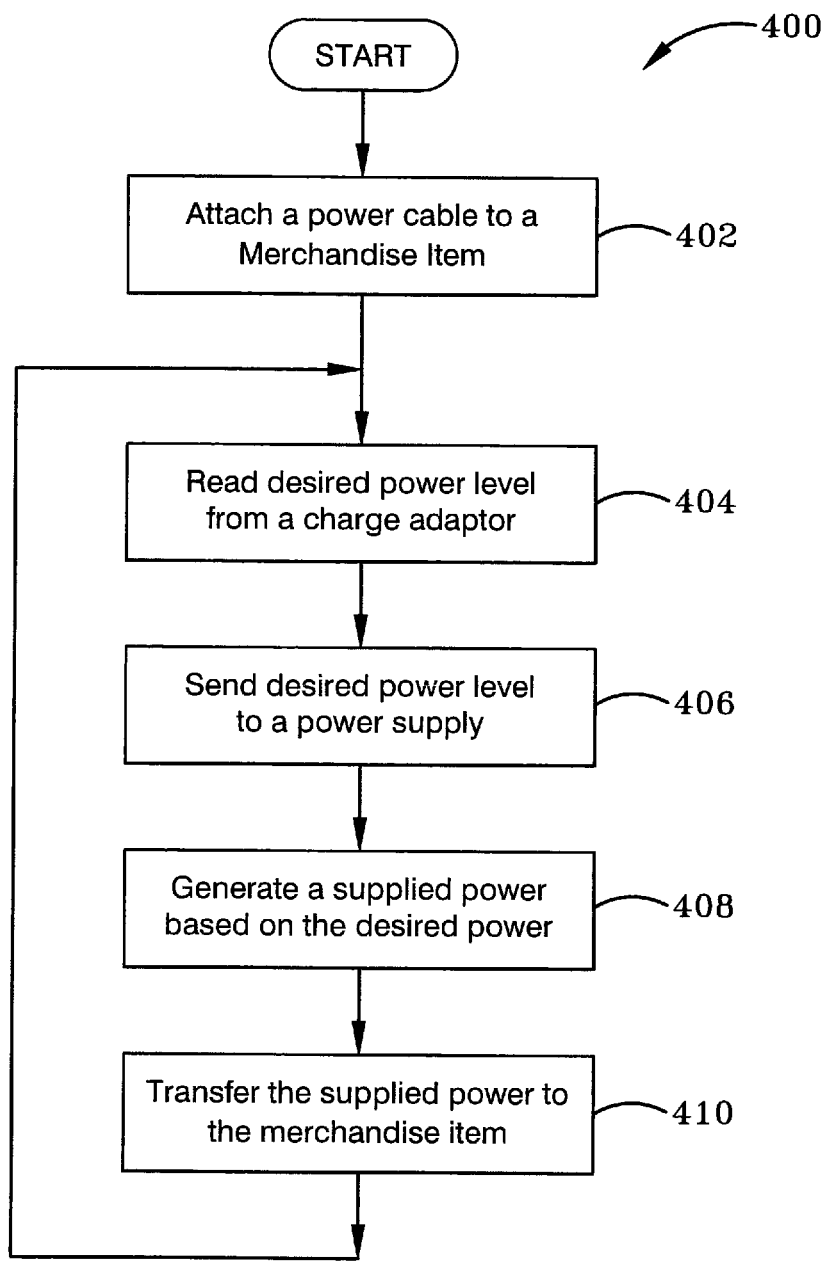
FIG. 4 illustrates the preferred embodiment of a power supply system configured as a method.

FIG. 4 illustrates a method 400 of powering a merchandise item. Method 400 begins by attaching a power cable to the merchandise item, at 402. Next, a desired power level is read from a charge adapter connected to the merchandise item, at 404. The desired power level is read into a microcontroller in the power cable. An initial voltage level can also be read at the cable end connected to the merchandise item. The desired power level is sent from the microcontroller to a power supply, at 406. The initial voltage read at the cable end at merchandise item can also be sent to the powers supply. As discussed earlier, the cable is preferably a three-wire cable and the microcontroller communicates with the power supply over a single communications conductor in this cable. The power supply generates a supplied power, at 408, based, at least in part, on the desired power level and in some configuration an initial voltage read at the cable end at the merchandise item. The supplied power level is transferred over the power cable, at 410, to the merchandise item.

In another configuration, method 400 can continue to monitor and adjust the supplied voltage. For example, method 400 can determine measured voltage values at the second end of the cable preferably near the merchandise item. At least some of these values can be sent to the power supply. The power supply can then adjust the supplied power based, at least in part, on the measured voltage values so that the desired power is received at the merchandise item.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A power supply system for supplying power to a merchandise item on display, the power supply system comprising:
    a power supply unit comprising:
        a variable power supply; and
        power supply control logic;
    a power cable with a first end and a second end configured to be attached to a power socket of the merchandise item, wherein the first end is configured to be attached to the power supply unit, wherein the power cable further comprises:
    cable control logic configured to read a power requirement from a charge adaptor logic and to communicate the power requirement over the power cable to the power supply control logic; and
    wherein the power supply control logic is configured to control the variable power supply based, at least in part, on the power requirement so that the variable power supply generates a supplied voltage onto the power cable to power the merchandise item, and
    wherein the power supply control logic, the cable control logic and the charge adaptor logic, are microcontrollers executing software instructions stored on a non-transitory storage device.

2. The power supply system of claim 1 wherein the power cable is comprised of:
    two conductors for transmitting the supplied voltage; and
    a single communications conductor over which the cable control logic and the power supply control logic communicate.

3. The power supply system of claim 2 wherein the power cable only has the three conductors and no other conductors.

4. The power supply system of claim 2 further comprising: regulator logic configured to regulate a voltage of the single communication conductor.

5. The power supply system of claim 1 wherein the charge adaptor logic is one of the group of: a memory and one or more resistors.

6. The power supply system of claim 1 wherein the charge adaptor is located near the second end of the power cable.

7. The power supply system of claim 1 wherein the cable control logic further comprises:
an analog-to-digital converter (ADC) configured to generate a digital voltage value of the supplied voltage at the second end of the power cable, wherein the cable control logic is configured to send the digital voltage value over the power cable to the power supply control logic, wherein the power supply control logic is configured to receive the digital voltage value and control the variable power supply based, at least in part, on the digital voltage value.

8. The power supply system of claim 1 wherein the cable control logic further comprises:
a voltage measurement device configured to measure a voltage value in the cable and wherein the cable control logic is configured to generate data value representative of the supplied voltage at the second end of the power cable based, at least in part, on the voltage value wherein the cable control logic is configured to send the voltage value to the power supply control logic, and wherein the power supply control logic is configured to receive the voltage value and control the variable power supply based, at least in part, on the voltage value.

9. The power supply system of claim 1, wherein the power cable comprises:
a single communication wire, wherein the power supply control logic and the cable control logic communicates over the single communication wire.

10. The power supply system of claim 9 wherein the power supply control logic and the cable control logic are configured to communicate over the single communication wire using digital messages.

11. The power supply system of claim 9 wherein the power supply control logic and the cable control logic are microcontrollers executing software instructions.

12. The power supply system of claim 1 further comprising:
a measuring device configured to periodically measure the supplied voltage at the second end of the cable and configured to create corresponding measured voltage values, wherein the cable control logic further comprises:
a microcontroller configured to execute software instructions to periodically send at least some of the measured voltage values to the power supply control logic.

13. The power supply system of claim 1 wherein the power supply control logic is configured to control the variable power supply based, at least in part, on the measured voltage values and on known line and connector losses of the power cable.

* * * * *